Jan. 25, 1955 W. C. SPEED ET AL 2,700,367

APPARATUS FOR PRODUCTION OF MAGNETIC SOUND TAPE

Filed Dec. 21, 1950 6 Sheets-Sheet 1

INVENTORS
William C. Speed
James J. Dwyer
BY
Pennie Edmonds Morton & Barrows
ATTORNEYS Jan. 25, 1955 W. C. SPEED ET AL 2,700,367

APPARATUS FOR PRODUCTION OF MAGNETIC SOUND TAPE

Filed Dec. 21, 1950 6 Sheets-Sheet 2

INVENTORS
William C. Speed
James J. Dwyer
BY
Pennie Edmonds Morton & Barrows.
ATTORNEYS

APPARATUS FOR PRODUCTION OF MAGNETIC SOUND TAPE

Filed Dec. 21, 1950 6 Sheets-Sheet 3

INVENTORS
William C. Speed
James J. Dwyer
BY
Pennie Edmonds Morton & Barrows
ATTORNEYS

APPARATUS FOR PRODUCTION OF MAGNETIC SOUND TAPE

Filed Dec. 21, 1950 6 Sheets-Sheet 4

INVENTORS
William C. Speed
James J. Dwyer
BY
Pennie Edmonds Morton & Barrows
ATTORNEYS Jan. 25, 1955 W. C. SPEED ET AL 2,700,367

APPARATUS FOR PRODUCTION OF MAGNETIC SOUND TAPE

Filed Dec. 21, 1950 6 Sheets-Sheet 5

INVENTORS
William C. Speed
James J. Dwyer
BY
Pennie Edmonds Morton & Barrows
ATTORNEYS

APPARATUS FOR PRODUCTION OF MAGNETIC SOUND TAPE

Filed Dec. 21, 1950 6 Sheets-Sheet 6

INVENTORS
William C. Speed
James J. Dwyer
BY
Pennie Edmonds Morton & Barrows
ATTORNEYS United States Patent Office 2,700,367

Patented Jan. 25, 1955

2,700,367

APPARATUS FOR PRODUCTION OF MAGNETIC SOUND TAPE

William C. Speed, Riverside, and James J. Dwyer, Stamford, Conn., assignors to Audio Devices, Inc., New York, N. Y., a corporation of New York Application December 21, 1950, Serial No. 201,975

12 Claims. (Cl. 118—67)

This invention relates to the production of magnetic recording tape and has for its object improvements in the method of and apparatus for producing such tape.

In the production of magnetic sound recording and reproducing tape it is customary to pass a relatively long and narrow tape base band successively through one or more coating and drying zones, one side of the tape base being coated with a layer of free-flowing magnetic material while moving through the coating zone and the layer being dried while moving through the drying zone. Various tape base materials are used, such as paper, plastics, etc., the most common being paper and cellulose acetate. Various magnetic materials may be used for the coating, the one most commonly used at the present time being very finely divided magnetic oxide of iron; not the natural magnetic oxide of iron, but one that is produced artifically because its quality can be better controlled. A dispersion of the magnetic material in a suitable vehicle or carrier is prepared, the vehicle usually containing a solvent, such as tolulol, isopropyl acetate, etc. The dispersion, while free-flowing, has a viscosity conductive to the laying down of a coating of given thickness on the tape base which remains substantially intact during the drying operation. The solvent is volatilized during the drying operation leaving a solid but pliable residue of the magnetic material on the tape base.

In order to facilitate and to improve adherence of the magnetic material to the tape base, the surface of the tape base to be coated with the magnetic material may be precoated with a suitable adhesive material, such as a copolymer of polybutadiene with acrylonitrile, the methyl esters of acrylic acid, etc. The magnetic material is then laid on the adhesive surface and subjected to drying.

During either or both coating operations, the tape base is passed between a bottom support and the discharge opening of a feed hopper of the coating material, so that the coating is applied to the tape base as it moves thereunder. In the magnetic coating operation, the tape base is passed horizontally through a gap between the bottom support and the feed hopper.

No matter how carefully the tape base is made or how carefully the coating operation is conducted, difficulties arise which affect the results. Thus, the tape base itself will have an occasional pimple or berry-like projection on its upper or underside, or both; or a foreign particle may be deposited on and cling to the tape base. Such obstructions interfere with the passage of the tape base through the gap. They, for example, may strike the feed hopper or the support below, resulting in a tearing of the tape base. If this should happen magnetic material will continue to be discharged from the feed hopper and will spread over the surrounding portions of the apparatus. The tearing of the tape base further complicates matters by making difficult the rejoining of the torn ends by splicing or any other manner. In practically all cases tearing of the tape base requires the coating operation to be stopped until the resulting mess is cleaned up. Even though the obstruction should pass through the gap without tearing the tape base, it may objectionably impair the quality of the magnetic coating applied to the tape base. It may, for example, prevent the deposit of a coating of uniform thickness transversely across the tape base.

Additional difficulties are encountered in the drying operation. As in the coating operation, the tape base is progressively moved over and around a series of rollers or guide supports. The tape base tends to curl in a manner that causes further difficulties in processing as well as in actual use.

While it is important to obtain a coating of magnetic material of optimum and uniform thickness on the moving tape base, it is also important that the coating be effectively dried without injury to the coating. Unless the coating is adequately dried before it comes in contact with a roller, guide support or other physical object, the coating is physically injured which in turn affects its sound recording and sound reproducing characteristics.

Difficulties and disadvantages of the kind enumerated, as well as others, may for the most part be avoided in the practice of the present invention; as will be made clear on referring to the accompanying drawings, taken in conjunction with the following description, in which.

Figures 1, 2:
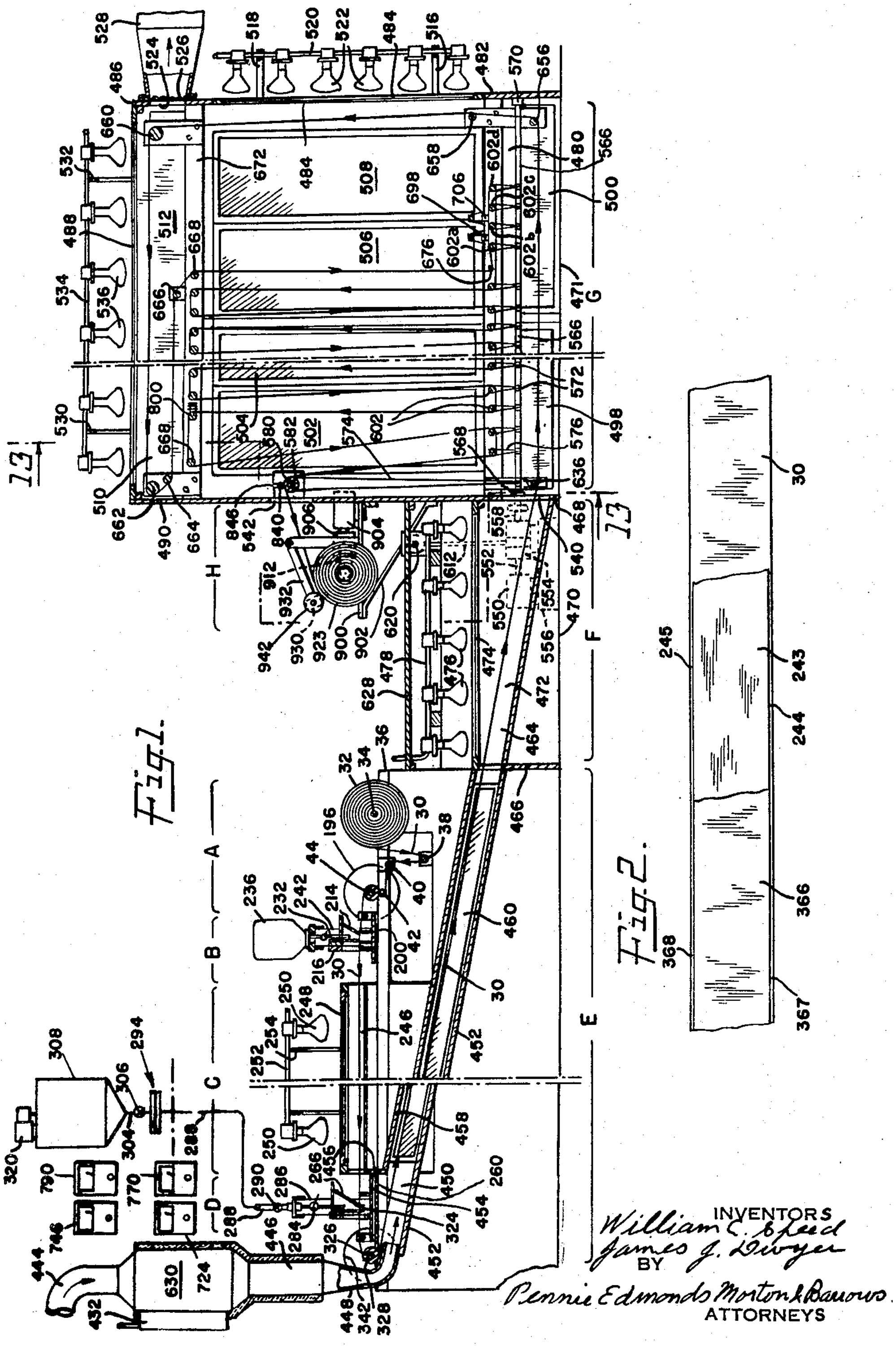
Fig. 1 is a longitudinal sectional elevation of a form of apparatus illustrative of a practice of the invention.
Fig. 2 is a plan view of a piece of tape base showing an uncoated, an adhesive coated and a magnetic coated portion.
Figure 3:
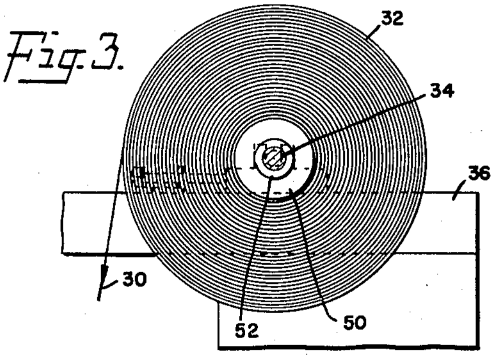
Figure 5:
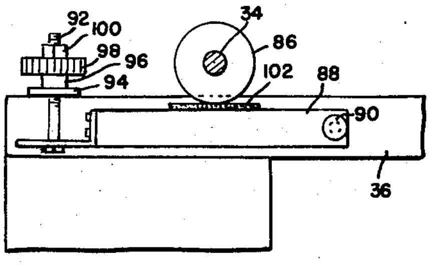
Figures 4, 12:
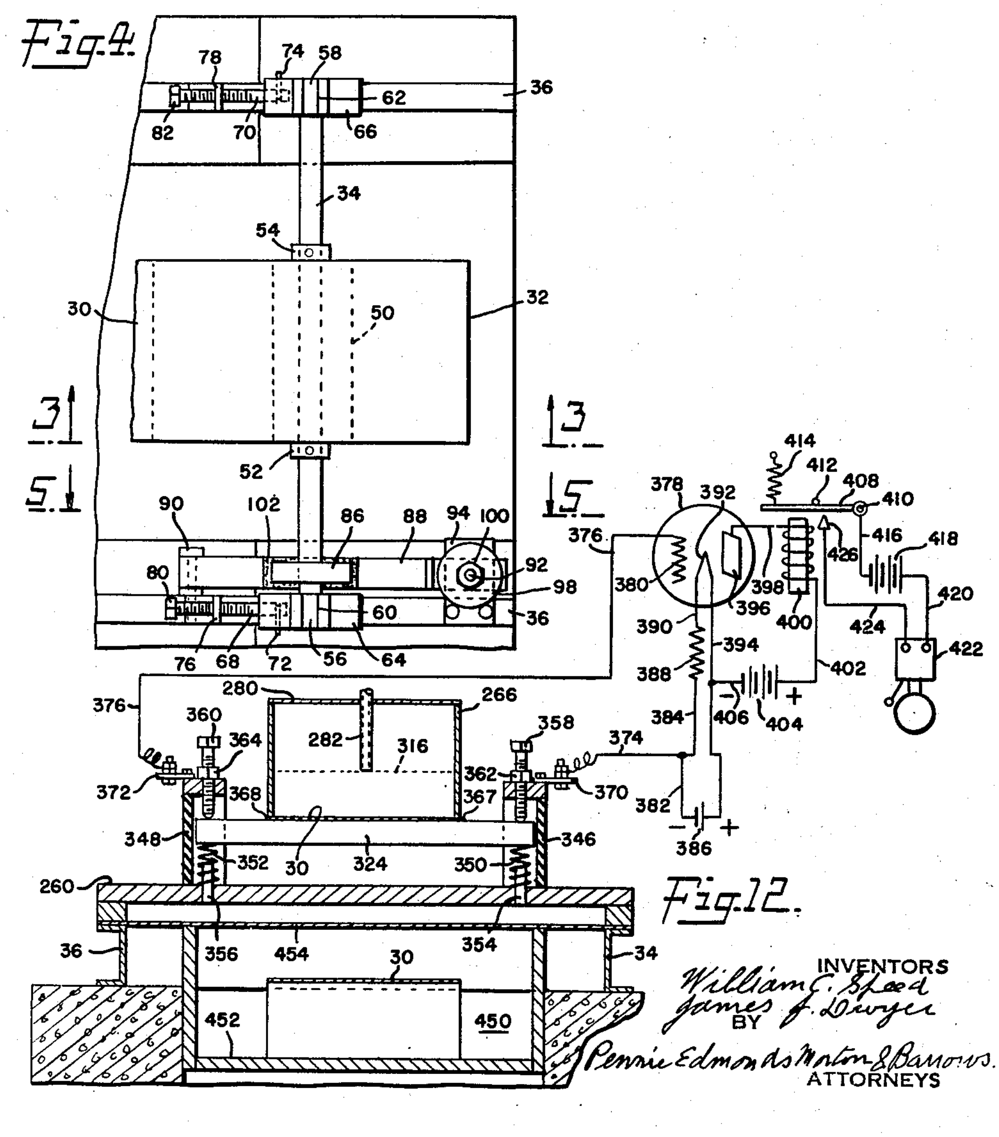
Figures 6, 7, 8, 11:
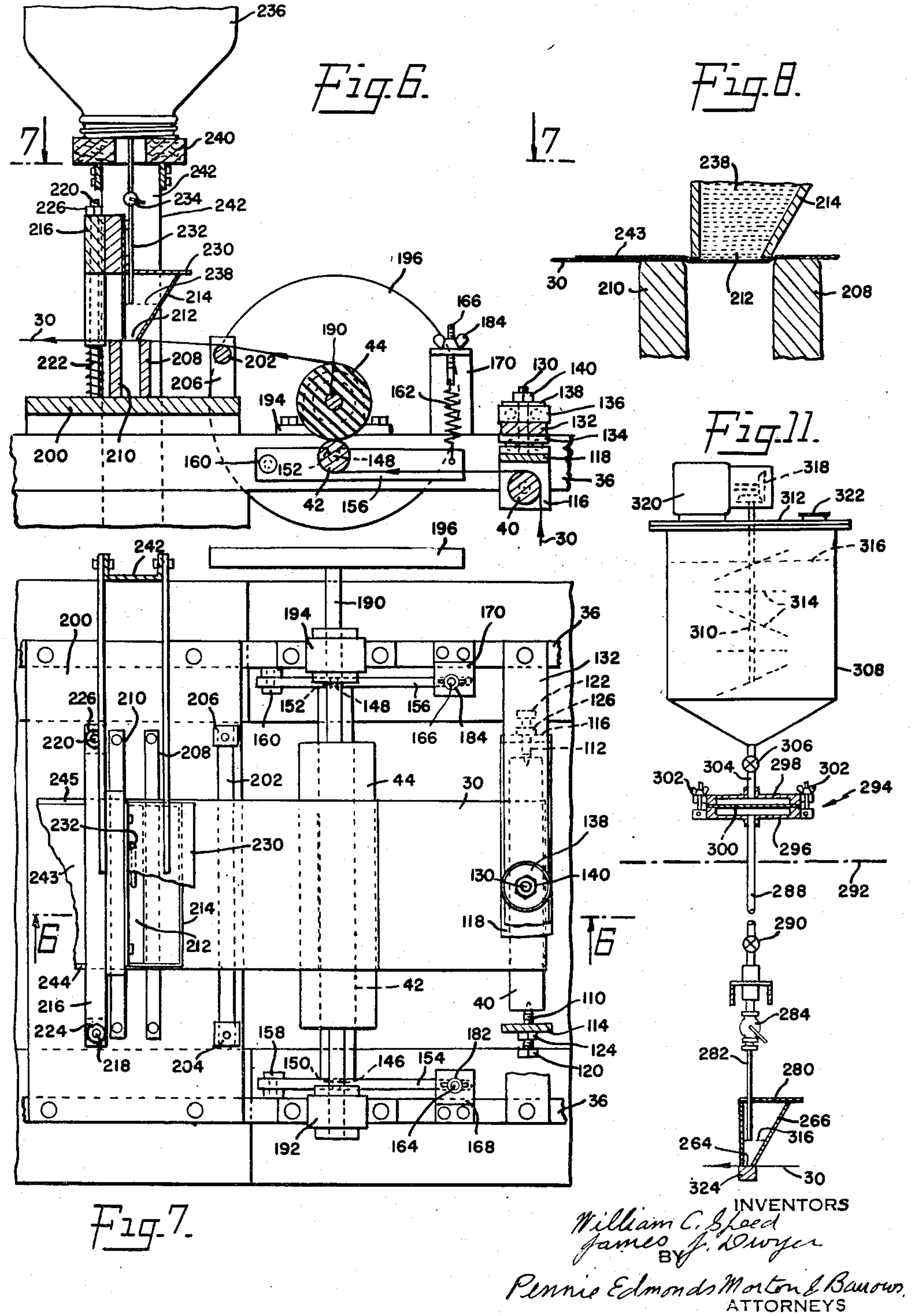
Figures 9, 10:
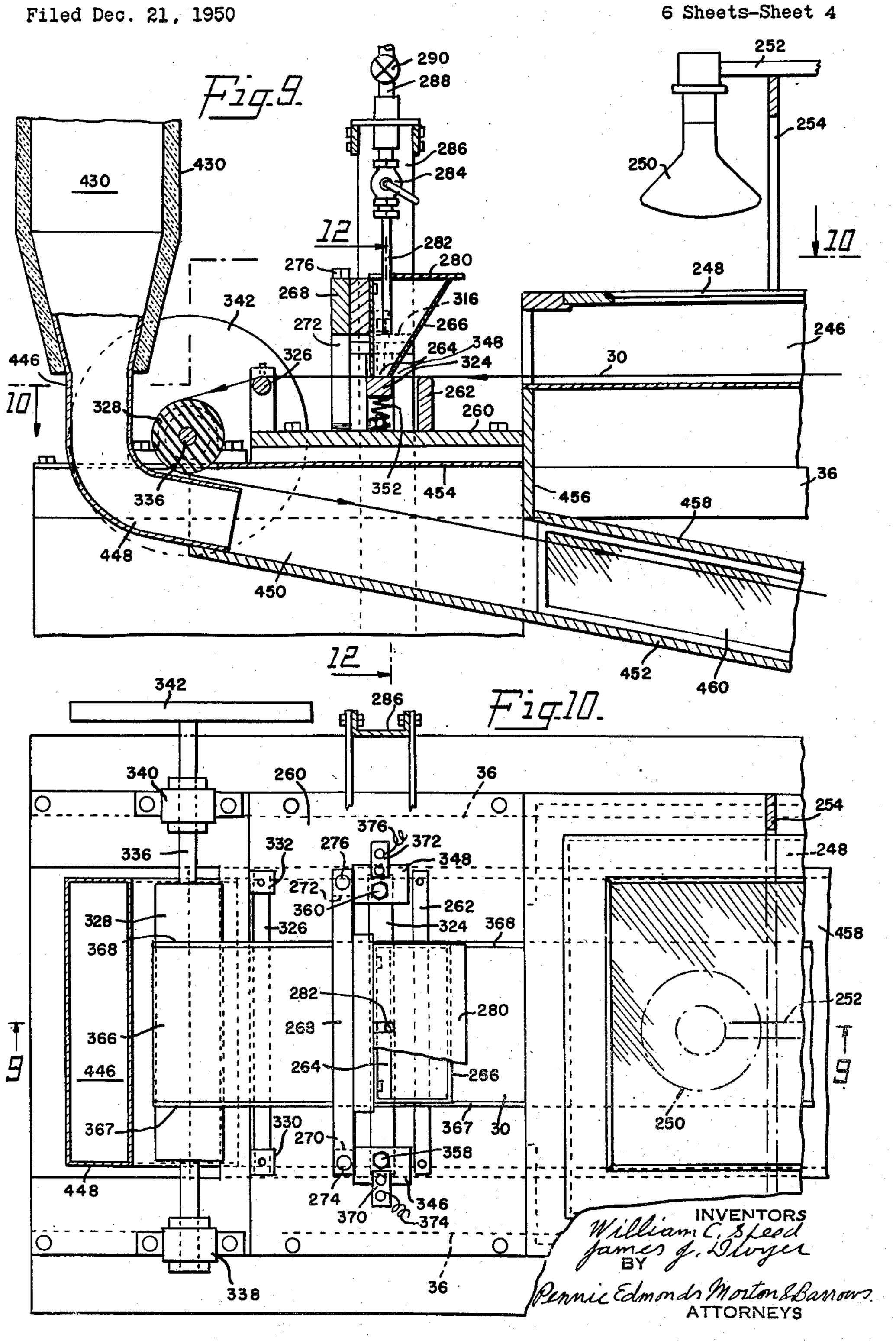
Figures 13, 14, 15, 16, 17, 18:
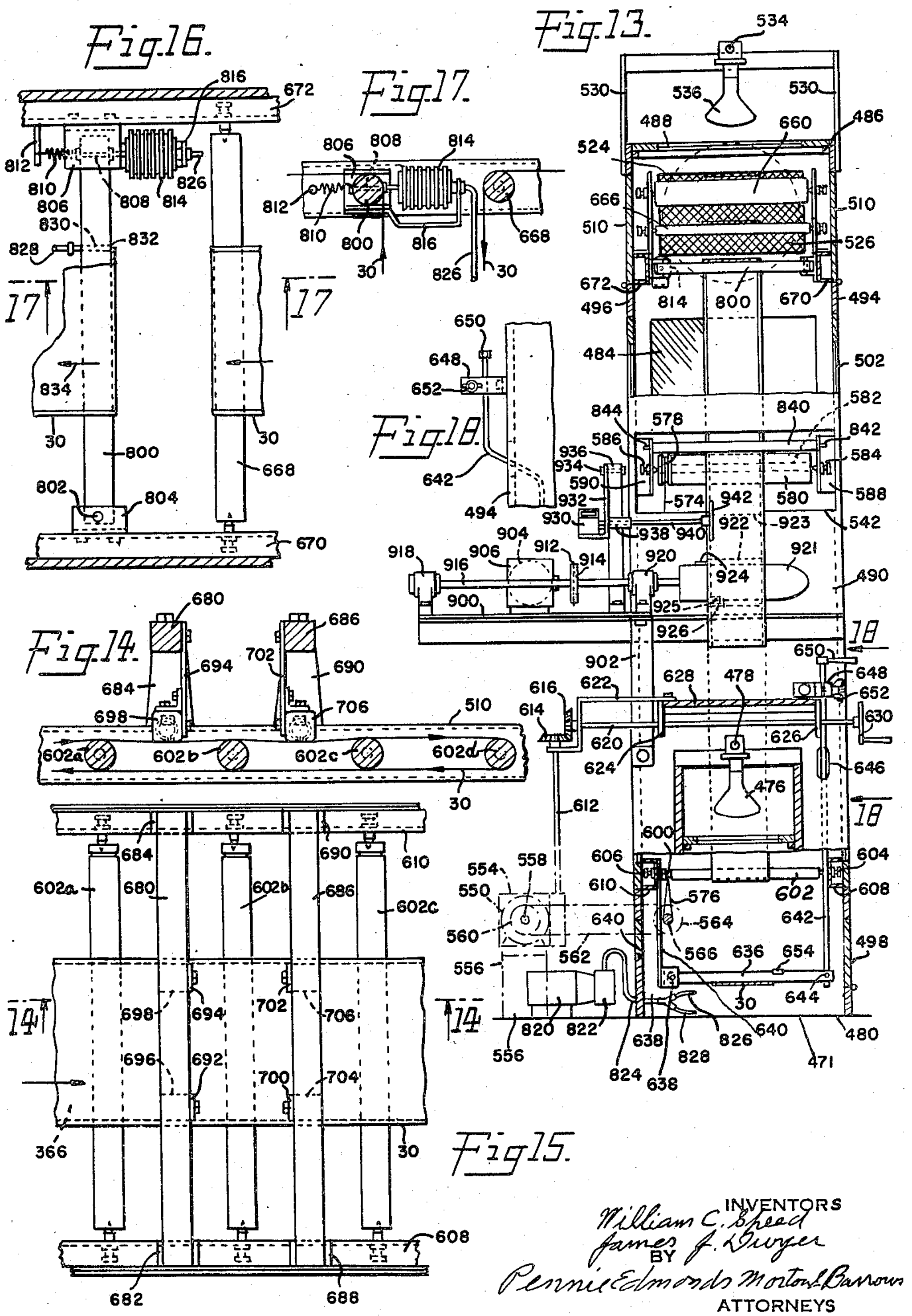
Figures 19, 20, 21:
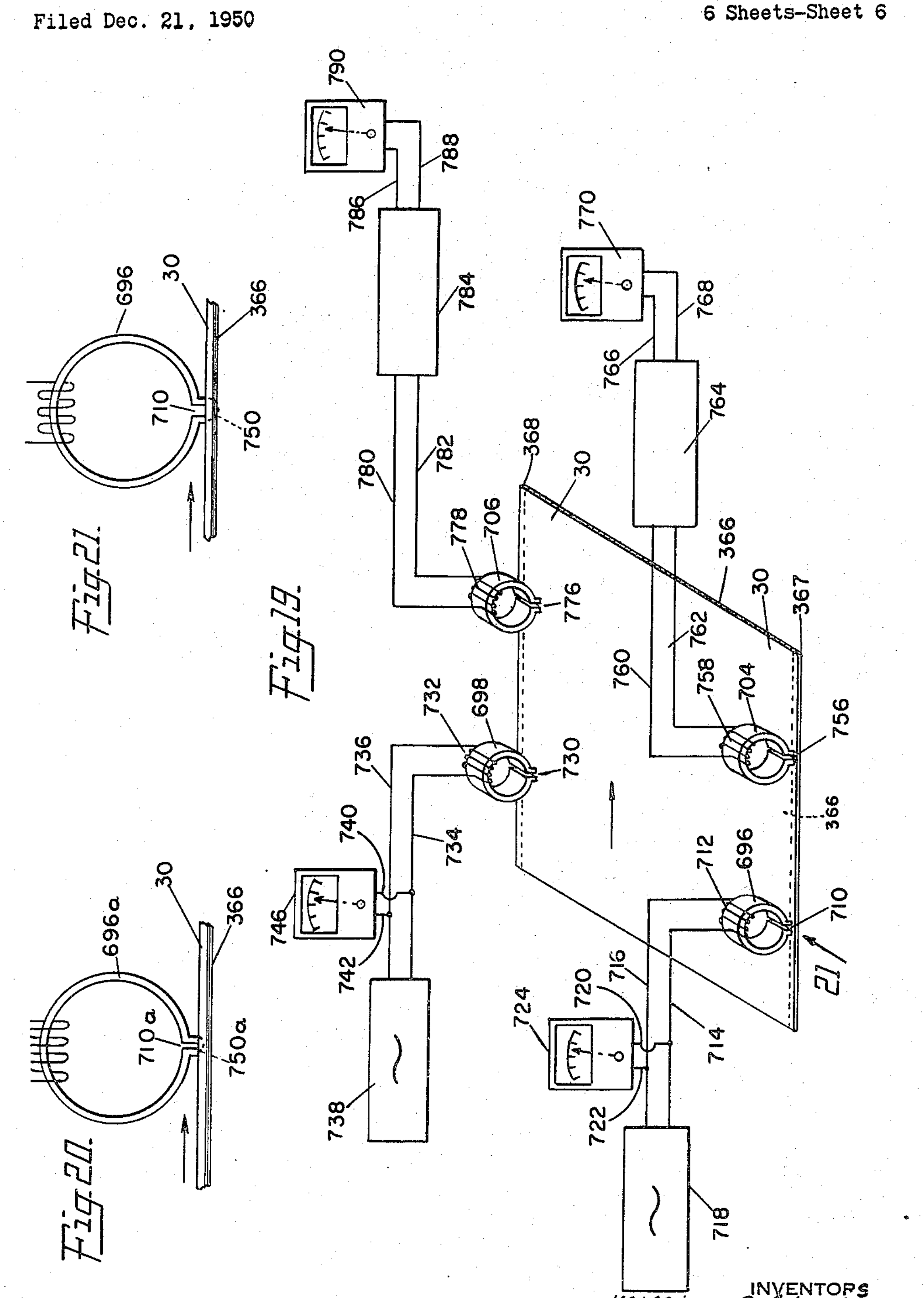

Figs. 3, 4 and 5 are enlarged views of the tape base charging portion of the apparatus, Fig. 4 being a plan view and Figs. 3 and 5 being sectional views on the lines 3—3 and 5—5, respectively, of Fig. 4;

Figs. 6, 7 and 8 are enlarged views of the tape precoating portion of the apparatus (Figs. 6 and 7 also showing portions of the tape base charging apparatus), Fig. 6 being a sectional view on the line 6—6 of Fig. 7, Fig. 7 a sectional elevation on the line 7—7 of Fig. 6 and Fig. 8 a fragmentary sectional elevation showing the adhesive feed hopper, tape base and its guide supports;

Figs. 9, 10, 11 and 12 are enlarged views of the magnetic coating portion of the apparatus, Fig. 9 being a section on the line 9—9 of Fig. 10, Fig. 10 a section on the line 10—10 of Fig. 9, Fig. 11 an elevation, sectional in part, of the feed hopper and its supply line, and Fig. 12 a section on the line 12—12 of Fig. 9 showing the signal or alarm system;

Fig. 13 is a section on the line 13—13 of Fig. 1 showing portions of the final drying and discharging zones;

Figs. 14 and 15 are fragmentary views of the magnetic testing portion of the apparatus, Fig. 14 being a sectional view on the line 14—14 of Fig. 15 and Fig. 15 a plan view;

Figs. 16 and 17 are fragmentary views of the tape aligning portion of the apparatus in the final drying zone, Fig. 16 being a plan view and Fig. 17 a section on the line 17—17 of Fig. 16;

Fig. 18 is a fragmentary elevational view on the line 18—18 of Fig. 13 showing the adjusting rod for the coated tape base guide support in the final drying zone; and Figs. 19, 20 and 21 are detailed views of the magnetic testing portion of the apparatus shown generally in Figs. 14 and 15, Fig. 19 being a perspective view and Figs. 20 and 21 elevational views.

Referring first to Fig. 1, the apparatus shown is divided into (1) a tape base charging zone A; (2) a pre-coating zone B; (3) a radiant-heat pre-coat drying zone C; (4) a magnetic coating zone D; (5) a heated-air preliminary drying zone E; (6) a heated-air radiant-heat preliminary drying zone F; (7) a heated-air radiant-heat final drying zone G; and (8) a tape base discharging zone H.

As will be explained in more detail below, the tape base is passed successively through (1) the tape base charging zone A, where it is carefully unwound from its roll; (2) the pre-coating zone B, where its upper surface is treated with a liquid adhesive material; (3) the radiant-heat pre-coat drying zone C, where some of the solvent is removed from the adhesive coating; (4) the magnetic coating zone D, where a coating of magnetic material, such as oxide of iron, is applied to the adhesive coating; (5) the heated-air preliminary drying zone E, where some of the solvent in the coating is removed; (6) the heated-air radiant-heat preliminary drying zone F, where more solvent is removed from the coating; (7) the heated-air radiant-heat final drying zone G, where the final stage of the drying operation takes place; and (8) the tape base discharging zone H, where it is wound into a roll.

The apparatus specifically disclosed in the drawings will be described in the order just outlined; that is, from the first to the last zone.

*Tape base charging zone A*

Referring first to Fig. 1, a tape base 30 of any suitable material, such as paper, cellulose acetate, etc., in the form of a roll 32, is mounted on a shaft 34 supported by a frame 36. The tape base extends around rollers 38, 40, 42 and 44 which are suitably supported by the frame.

The position of shaft 34, and hence of roll 32, as more particularly shown in Figs. 3, 4 and 5, is adjustable, so that the tape base may be unwound from the roll and advanced for pre-coating in an optimum manner. As it comes from the manufacturer, the roll of tape is fitted with a hub 50 having a central hole adapted to receive the shaft. Collars 52 and 54 fit on the shaft. They are provided with set screws so that the roll may be placed and maintained in its optimum position for unrolling.

The shaft is provided with bearing ends 56 and 58 of smaller diameter adapted to fit into bearing slots 60 and 62 of slidable bearings 64 and 66 resting flatly on the opposite sides of the frame. The non-threaded inner ends of adjusting screws 68 and 70 fit into the far ends of the bearings, the ends of the screws being held within the bearings by lock pins 72 and 74 extending laterally into the end walls of the bearings and into annular grooves in the end portions of the screws. Due to this construction the screws may turn freely within the walls of the bearings without being pulled therefrom.

A pair of supports 76 and 78, each with a threaded hole, is integrally secured to the tops of the side members of the frame. Since the threaded portions of the screws fit into the threaded holes of the supports, heads 80 and 82 of the screws may be turned suitably to move the bearings forwardly or rearwardly. One screw may be turned more than the other in order also to alter the transverse angle of spindle 34 with respect to the direction of travel of the tape base.

In order to keep the tension and rate of unwinding of the tape base from the roll under control, special braking means are provided. They comprise a brake-disc 86 integrally secured to and near one end of the spindle. A brake-arm 88 is pivotally secured at one end to the frame by means of a pivoting member 90. The other end of the brake-arm is freely supported by an adjusting bolt 92 in turn supported by a bracket 94 secured to the frame. A washer 96 and a hand wheel 98 are disposed between the bracket and a nut 100. A brake-block or band 102 is secured to the top of the brake arm, directly below brake-disc 86. As more particularly shown in Fig. 5, the hand wheel may be turned in the appropriate direction to raise or lower the brake-arm and hence to increase or decrease the braking action between the brake-disc and the brake-block, and thereby to control the speed of rotation of the spindle and the roll.

Roller 40 is specially suspended and supported (Figs. 6 and 7) to inhibit tendencies of the tape base to curl and to help compensate for curl present initially in the tape base, as well as to align the tape base in its path of travel to the pre-coating zone. As more clearly shown in Fig. 7, the roller is suspended at its centrally recessed ends by means of threaded lateral pivot members 110 and 112 extending through and supported by depending arms 114 and 116 of a yoke 118. The position of the pivot members with respect to the roller may be adjusted and maintained by turning their heads 120 and 122 and lock nuts 124 and 126. The yoke is in turn suspended midway between its ends by a pivot bolt 130 extending upwardly through a cross-support 132 secured at its ends to the frame. To assure easy pivoting of the roller, and hence of its yoke laterally of the tape base, a roller-bearing assembly 134 (Fig. 6) is provided between the top of the yoke and the bottom of the cross-support, and another roller-bearing assembly 136 is provided between the top of the cross-support and washer 138 under nut 140. The roller is thus able automatically to adjust itself to the right or left, in the direction of travel of the tape base, about its midpoint in response to planar variations in the tape base as it passes over the roller.

Roller 42 is provided at its ends (Fig. 7) with bearing shoulders 146 and 148 of smaller diameter, which fit in journal slots 150 and 152 in the top intermediate portion of pivoting arms 154 and 156 pivotally secured at their far ends to the frame by means of securing members 158 and 160. The near ends of the pivot arms are each suspended (Fig. 6) from the lower ends of springs 162, secured at their upper ends (Fig. 7) to bolts 164 and 166 extending through Z-shaped brackets 168 and 170 fastened to the frame. Wing nuts 182 and 184 may be used to adjust the tension of the springs to regulate and maintain the upward thrust of the roller toward roller 44, and hence to regulate and maintain the amount of grip of the rollers on the tape base as it passes between them.

Roller 44 is advantageously formed of rubber to ensure a better grip on the tape base. The roller is mounted on a shaft 190 extending transversely across the top of the frame and fitting in journals 192 and 194 secured to the frame. The far end of the shaft is fitted with a flywheel 196 to help keep the tape base under uniform tension as it passes into the precoating operation.

*Pre-coating zone B*

Still referring to Figs. 6 and 7, a platform 200 extends across and is secured to the frame. A laterally disposed guide rod 202 extends across the near end of the platform, being secured at its ends to vertical supports 204 and 206 in turn secured to the platform. As more clearly shown in Fig. 6, a pair of parallel supports 208 and 210 is secured to the platform, being disposed to the sides of the discharge opening 212 of a feed hopper 214 secured at its rear upper portion to a vertically adjustable bracket 216. The ends of the bracket are provided with vertical passageways fitted with a pair of vertically disposed rods 218 and 220 integrally secured at their lower ends to the platform. The lower unthreaded ends of the rods are fitted with a coiled spring 222 and the upper threaded ends are fitted with nuts 224 and 226. This construction permits vertical adjustment of the feed hopper. The nuts may be suitably turned to elevate or lower the hopper and hence to adjust its position with respect to the tops of parallel guide supports 208 and 210 and the top of the tape base.

The top of the hopper is provided with a removable cover 230, through which extends a conduit 232, with a regulating valve 234, depending from a container 236 of suitable liquid adhesive material 238. The container rests on an annular cushion 240 carried by a support 242 attached to the frame.

As more clearly shown in Fig. 8, discharge opening 212 of the hopper is advantageously placed slightly below the top level of parallel guide supports 208 and 210. This depresses tape base 30 slightly into the space between the supports, thus causing it to wipe against the bottom of the hopper. Since only a very thin coat 243 of adhesive material is desired, this wiping action is sufficient to provide it. As shown in Fig. 7 narrow side portions 224 and 245 of the tape base extend slightly beyond the sides of the discharge opening of feed hopper 214 which do not receive the adhesive material (Fig. 2).

*Pre-coat drying zone C*

The pre-coat drying device is in the form of an elongated tunnel 246 (see Figs. 1, 9 and 10) enclosed by a bottom, side walls and a glass covered top 248; the ends of the tunnel being open so that the tape base may pass therethrough while suspended and out of contact with the walls. A plurality of heating devices 250, such as infrared lamps, are mounted directly above the glass covered top; the lamps being suspended from an electric conduit 252 in turn supported by vertical posts 254 attached to the frame.

Radiant heat is passed through the glass covered top onto the coated top of the tape base passing through the tunnel. As the adhesive pre-coat comes from the precoating machine, it is generally more liquid or less viscous than is desired for the subsequent coating operation with magnetic material. Some of the solvent is, therefore, advantageously volatilized from the adhesive pre-coat in the pre-coat drying zone while the tape base moves in its path of travel to the magnetic coating operation.

*Magnetic coating zone D*

Referring to Fig. 1 and particularly Figs. 9 and 10, it will be noted that the magnetic coating device is formed in general of a platform 260 extending across and integrally secured to the frame. A guide support 262 is integrally secured to the platform, the top of the guide support being approximately in alignment with the discharge opening 264 of a hopper 266 supported at its rear by a bracket 268; the ends of the bracket being in the form of vertical posts 270 and 272 having passageways therethrough for bolts 274 and 276 securable at their lower ends to the platform. The bolts may be suitably turned in order to place and maintain the discharge opening of the hopper at its preferred operating level. A removable cover 280 on the hopper is slotted to receive a vertically disposed lower conduit 282 with a regulating valve 284. The conduit is secured to a vertical support 286 fastened at its lower end to the frame.

As shown in Fig. 11 the lower conduit communicates with a second conduit 288, which in the instant construction extends through a ceiling 292 to the floor above. The second conduit with a valve 290 connects with a filter 294. While any suitable filter may be used, the current one is in the form of two juxtaposed hollow members 296 and 298 containing several layers of fabric filters 300, such as filter paper, stretched between the two hollow members. The two hollow members are non-leakably held together by a plurality of wing nuts 302. A third conduit 304, with a valve 306, connects the filter with the bottom of a stirring or mixing vessel 308 having a shaft 310 depending from its top 312; the shaft being provided with a plurality of paddles 314 and arranged at different angles to each other, in order more effectively to stir or mix magnetic coating material 316 contained therein. The upper end of the shaft extends through the top and is operatively connected with meshing gears 318 driven by a motor 320. A closable opening 322 is in the top for introducing a dispersion of magnetic material, such as oxide of iron, into the mixing vessel.

It seems that no matter how carefully the tape base is made, or processed preparatory to coating with the magnetic material, as it approaches feed hopper 266 raised or lowered portions on its upper or lower side, or both, in the form of pimples or berries, for example, are encountered which not only affect the passage of the tape base underneath the hopper, but also the recording characteristics of the tape. If the obstruction is fairly large in size, the tape base may jam against the hopper and be torn or otherwise damaged. The tearing of the tape base at this stage leads to highly undesirable complications. The magnetic dispersion flows out of the hopper and overruns the adjacent apparatus; the momentum of the oncoming tape base causes it to pile up; the pre-coating operation is, of course, impaired; and the entire operation must be stopped. If the obstruction does not tear the tape base, irregularities in the coating occur which greatly impair sound recording and hence sound reproduction. It is imperative that the finished tape have a magnetic coating of optimum uniform thickness.

Special means are provided, therefore, to prevent tearing of the tape base and to overcome abnormal irregularities in the coating. To this end a bottom support 324 for the tape is provided below the feed hopper, which may be said to free-floating because it can drop sufficiently to permit the obstruction to pass underneath without tearing the tape base and to signal an operator so that he may mark promptly the affected spot for subsequent treatment, to be described below.

While Figs. 9 and 10 indicate such means, they are more fully detailed in Fig. 12. Referring first to Fig. 9, it will be noted that tape base 30 passes over the top of guide support 262 and then over adjustable bottom support 324 disposed directly below discharge opening 264 of feed hopper 266, and from there to and over guide support rod 326 and roller 328. The latter guide support extends (Fig. 10) across platform 260, being attached at its ends to vertical posts 330 and 332 secured to the platform. Guide supports 262 and 326 are about the same height and are so arranged with respect to the bottom of feed hopper 266 and bottom support 324 that a gap of predetermined minimum uniform height is provided and maintained between the top of tape base 30, or the top of bottom support 324, and the bottom of the hopper so that a coating of magnetic material of optimum thickness may be applied to the top of the tape base as it moves under the hopper.

Roller 328 is placed below the level of guide support 326 and is preferably made of such material as rubber so that it may grip the underside of the coated tape base. The roller is tightly mounted on a spindle 336 mounted in journals 338 and 340 secured to frame 36. A flywheel 342 fits on the far end of the spindle. Roller 328 with its flywheel and roller 44 with its flywheel (Fig. 1) keep tape base 30 under tension and uniform speed, thus helping to assure optimum coating operations.

Returning to Figs. 9 and 10, bottom support 324 extends across and well beyond the ends of discharge opening 264 of feed hopper 266, intermediate a pair of open box supports 346 and 348 secured at their bottoms to platform 260.

This is also brought out in Fig. 12 which will now be considered in more detail. Bottom support 324 rests at its ends on coil springs 350 and 352 held in vertical position by rods 354 and 356 secured to platform 260. Adjusting screws 358 and 360 extend downwardly through threaded holes in the tops of open box supports 346 and 348 into contact with the top of the bottom support. They are provided with locknuts 362 and 364. This construction permits adjustment of the bottom support with respect to the bottom of feed hopper 266 by turning the screws and lock-nuts suitably, so that a gap of predetermined minimum uniform height may be provided and maintained between the top of the bottom support, or the tape base, and the bottom of the hopper, to place a magnetic coating 366 of optimum thickness on the tape base. As shown in Fig. 12 tape base 30 is slightly wider than feed hopper 266, narrow side portions 367 and 368 extending beyond the sides of the discharge opening of the hopper which are not coated (Fig. 2); those side portions conforming in general to narrow side portions 244 and 245 which received no adhesive coating. Once such a gap (Fig. 12) is established between the hopper and bottom support, it cannot be made smaller, unless of course the screws and lock-nuts are disturbed.

But such a gap can be made larger by urging the bottom support downwardly against the coil springs. This happens when an obstruction on the tape base arrives between the bottom of the hopper and the bottom support. The obstruction, no matter whether to the side or in the center of the tape base, whether single or multiple, depresses the bottom support and rides under the hopper without tearing the tape base; unless, of course, the obstruction is abnormally large, which seldom occurs.

As already stated, means are also provided to signal the operator that such an obstruction has reached the hopper. While such means may take various forms, the one shown in Fig. 12 is illustrative. Being made of metal, bottom support 324, adjustable screws 358 and 360, and open box supports 346 and 348 are utilized as conductors of electrical current in a first relay having terminals 370 and 372 secured to the open box supports, the terminals in turn being connected to leads 374 and 376 in the circuit of a triode tube 378. The latter lead connects the grid 380 of the triode while the former lead terminates in two branches 382 and 384, the former being connected to the negative terminal of a battery 386, and the latter being connected to a resistance 388. A lead 390 connects the resistance with the filament 392 of the triode. The other lead 394 of the filament connects the positive terminal of the battery.

The anode plate 396 of the triode connects with a lead 398 in a second relay formed of a solenoid 400, a lead 402 connecting the coil of the solenoid with the positive terminal of a battery 404 and a lead 406 connecting the negative terminal of the battery with lead 394 connecting filament 392 with battery 386 in the other relay.

Solenoid 400 is operatively associated with a third relay formed of an arm 408 pivoted at one end 410 and normally held spaced from the solenoid by a stop 412 and a spring 414 at the other end. A lead 416 connects the arm with a battery 418. Another lead 420 connects the battery with a terminal of signal or alarm device 422, such as a bell; the other terminal being connected by a lead 424 to a terminal 426 spaced intermediate the end of solenoid 400 and arm 408.

In order briefly to illustrate the operation of the signal means just described, it may be assumed that a portion of tape base 30 approaching feed hopper 266 contains one or more obstructions, such as a pimple or berry-like formation of the tape base material itself, or one or more foreign particles attached thereto. Since the coating of magnetic material on the tape base must be of substantial uniform optimum thickness, and that thickness amounts to only a few thousandths of an inch, it is apparent that the obstruction need not be very large in order to strike the bottom of the hopper, if the obstruction is on the top of the tape; or to strike the top of the bottom support, if the obstruction is on the bottom of the tape base.

It is imperative, therefore, that the mechanism employed be extremely sensitive, so that the obstruction will pass between the hopper and bottom support without tearing the tape base and so that the presence of the obstruction is announced. Since bottom support 325 floats freely on sensitive coil springs 350 and 352, it is quickly and easily depressed to permit passage of the obstruction. Such depression of the bottom support breaks the contact between the bottom of the adjusting screw 358 and the top of the bottom support, or breaks the contact between the bottom of adjusting screw 360 and the top of the bottom support, or both.

Before the break of contract between the bottom support and the adjusting screws occurs, current passes continuously through the first relay; namely, from battery 386, through branch 382, lead 384, resistance 388, lead 390, filament 392, grid 380, lead 376, adjusting screw 360, bottom support 324, adjusting screw 358, lead 374 and branch 382 to the battery. Since grid 380 and filament 392 of the triode are both negatively charged, flow of electrons from the filament to positively charged anode plate 396 is prevented, or at least effectively inhibited, due to the negative field set up around the filament by the grid.

When, however, bottom support 324 is depressed by the passing obstruction and the circuit in the first relay is broken, no current flows to the grid and it becomes neutral. The neutralized grid, therefore, no longer prevents or inhibits the passage of electrons from the filament to the plate. The negative electrons from the filament are attracted in fact by the positively charged plate.

As current passes from battery 404 through the filament and plate, solenoid 400 is energized. Magnetization of the core of the solenoid attracts or pulls arm 408 in the third relay, causing it to contact terminal 426. When this occurs current from battery 418 passes freely through the relay causing the operation of signal or alarm device 422. In the construction shown, its bell is caused to ring thus calling the operator's attention to the fact that an obstruction on the tape base is passing underneath the feed hopper.

On hearing the signal, the operator promptly inspects the coated portion of the tape passing beyond the hopper to detect the precise location of the obstruction. He then attaches a marker on that part of the coated tape, usually by means of a relatively small adherent tab protruding beyond the edge of the tape base, so that the affected portion may be easily located later. The affected portion is usually cut out, which is done by removing a transverse section of the coated tape base and carefully splicing the resulting two ends of the main tape base having a coating of the desired uniform thickness; the two ends being joined, preferably, in an angular straight line, end to end, not overlapping, relationship—with an adhesive piece of splicing-tape overlapping the two ends on the non-coated side of the tape base.

*Heated-air preliminary drying zone E*

Returning for the most part to Fig. 1, although a fragmentary section thereof is shown in Figs. 9 and 10, it will be noted that the heated-air preliminary drying zone E extends from the left to the right, below the four zones already discussed, at an inclined angle downwardly toward the floor. The drying apparatus is formed of a heater 430 provided with electrical means 432 for heating a supply of air entering inlet 444 at the top of the heater and passing through an outlet 446 at the bottom of the heater through an elbow extension 448 into a duct 450. A blower and a filter, not shown, are included so that air free of lint, dust and other foreign particles may be forced successively into and through the duct and the other drying zones in the series.

The duct is formed of a bottom 452, a top comprising sections 454, 456 and 458 tightly fitting against each other to prevent escape of substantial amounts of heated air. The bottom portion of roller 328 and the portion of freshly coated tape base adjacent thereto dip into a narrow opening in top section 454. The duct is also provided with a side wall to the rear and a side wall to the front, each being fitted with a window door 460 to provide ready access to the interior of the duct and to permit the operator or operators to see coated tape base 30 passing therethrough. The coated tape base is suspended between and out of contact with the walls of the duct. As the coated tape passes through the duct, heated air flows concurrently therewith to effect preliminary drying of the fresh coating.

*Heated-air radiant-heat preliminary drying zone F*

Duct 450 just described (Fig. 1) communicates with the heater-air radiant-heat preliminary drying apparatus formed of a duct 464 supported in part by vertical walls 466 and 468, and enclosed except at the ends by bottom 470, a rear side wall, and a front side wall, each being equipped with a window door 472, and a top provided with a glass window 474. A plurality of electrically heated lights 476, such as infrared lamps, are mounted on a conduit 478 directly above and centrally of the top window. This arrangement permits radiant-heat to pass directly through the window onto the partially air-dried coating on the tape base passing through the duct, thus drying the coating still further.

*Heated-air radiant-heat final drying zone G*

Duct 464 communicates with the heated-air radiant-heat final drying apparatus formed in general of a relatively large rectangularly shaped chamber 480, defined at the bottom by a floor 471, a far end wall 482 having a window 484, a top 486 having a window 488, a near end wall 490 and front and back side walls 494 and 496, both side walls being fitted with lower doors 498 and 500, middle window doors 502, 504, 506 and 508, and upper window doors 510 and 512.

Far end wall 482 is provided with laterally extending and spaced supports 516 and 518 to which is secured a vertical conduit 520 located centrally of window 484. A plurality of electrically heated lamps 522, such as infrared lamps, spaced from each other at relatively short intervals are secured to the vertical support. The upper portion of the far end wall is provided with an exit opening 524 fitted with a screen 526, and around which is secured an outlet pipe 528 preferably communicating with the outside atmosphere.

Top 486 is provided with vertically extending and spaced supports 530 and 532 to which is secured an electric conduit 534 extending centrally of top window 488. A plurality of electrically heated lamps 536, such as infrared lamps, are secured to the latter support.

Near-end wall 490 is provided at its bottom with an opening 540 to permit passage of the coated tape base from duct 464 to drying chamber 480. The end wall is also provided with a discharge opening 542 intermediate its top and bottom to permit passage of the dried coated tape base from the drying chamber to the tape base discharging zone H.

Special power driven means (Figs. 1 and 13) are provided to move the tape base through the zones so far discussed. They comprise a motor 550, a shaft 552, a gear reducer 554 mounted on a foundation 556 near end wall 490 of the drying chamber, a shaft 558, a sprocket wheel 560, an endless drive chain 562, a sprocket wheel 564, and a drive shaft 566 extending inside and lengthwise of the chamber near its bottom and back side wall, the latter shaft being supported in journals 568 and 570 attached to end walls 490 and 482.

The drive shaft contains a series of spaced belt guide grooves 572, each of which is fitted with a drive belt; the first belt in the series from left to right, as one views Fig. 1, being a long belt 574 and the others being short belts 576. The long belt fits (Fig. 13) over and in a belt guide groove 578 at the far end of a discharge roller 580, preferably made of a gripping-material, such as rubber, mounted on a spindle 582 held in horizontal position by pivot members 584 and 586 (similar to pivot members 110 and 112 described above) carried by supports 588 and 590 attached to front and back side walls 494 and 496. The short belts fit over and in a belt guide groove 600 at the far end of each of a corresponding series of rollers 602 horizontally suspended between pivot members 604 and 606, such as previously described, carried by longitudinal supports 608 and 610 attached to the front and back side walls. All of the belts are to the far side of and beyond the path of travel of the coated tape base. Rotation of drive shaft 566 by motor 550 is adapted, therefore, to rotate directly rollers 580 and 602.

The speed of rotation of the directly driven rollers needs to be under accurate control so that an optimum speed may be adopted for a given set of operating conditions. For example, the nature of the coating itself, its formula, its thickness, the nature and efficiency of the drying media, the mechanical arrangement of the guide supports, rollers and other factors influence the rate of drying of the coating and the accuracy with which the coated tape base advances in its appointed path of travel. It is imperative, therefore, that an optimum surface speed of the advancing tape base be determined and maintained.

To this end the apparatus includes (Fig. 13) a control device formed in general of a vertical shaft 612 connecting at its lower end with gear reducer 554 and at its upper end with a bevel gear 614. This bevel gear is in mesh with another bevel gear 616 connected to a transverse rod 620 supported by brackets 622, 624, 626 attached to a main horizontal support 628 secured (Fig. 1) at one end to frame 36 and at the other end to end wall 490. In present practice this latter support also functions as a work bench for the operators. The near end of the transverse rod is fitted with a crank wheel and handle 630. The turning of the crank wheel permits adjustment of the gear reducer, so that the speed of the drive shaft 566, and hence of the power driven rollers 580 and 602 is adjustable.

So that the coated tape base may have a relatively long detention period in the chamber, at least one long enough for adequate drying of the coating, a series of other rollers and one or more guide supports are provided at strategic places in the chamber. Thus, an adjustable guide support 636 is provided at the entrance of the chamber, in the lower left hand corner. It is used to center and help maintain the tape base in its predetermined path of travel as it advances from roller to roller in the chamber. While the one shown is a non-rotating rod, a roller could of course be employed. The guide support is pivotally mounted (Fig. 13) at its far end 638 to a bracket 640 secured to support 610. A vertically disposed rod 642 is pivotally secured to the near end 644 of the guide support. It is bent to extend through a slot 646 in near end wall 490 to the exterior of the chamber (Figs. 13 and 18). The upper end of the rod extends into and through a clamp 648 and terminates in a handle 650. The clamp is provided with a wing nut 652. This construction permits (Fig. 13) vertical adjustment of the rod and hence angular adjustment of guide support 636 in a vertical plane. A marker 654, such as a piece of tape, is placed on or near the top of the guide support with one edge of the marker in alignment with the near edge of the tape base 30, or where that edge of the tape base normally should be, when moving accurately in its path of travel. This helps the operator to adjust the transverse position of the guide support angularly so that the tape base is transversely in uniform contact with the guide support and will be properly centered as it proceeds to succeeding rollers.

From guide support 636 at the lower left hand corner of the chamber (Fig. 1) the coated tape base passes to roller 656 at the lower right hand corner of the chamber. This causes the coated tape base to run substantially parallel to and a short distance above the bottom of the chamber for most of its effective length. A roller 658 located a short distance above the latter roller cooperates with a roller 660 in the upper right hand corner of the chamber to help direct the coated tape base vertically along side of end window 484 to receive radiant heat from lamps 522. A roller 662 in the upper left hand corner of the chamber cooperates with roller 660 to direct the coated tape base horizontally along side of top window 488 to receive radiant heat from lamps 536. A roller 664 located a short distance below and slightly to the right of roller 662 deflects the coated tape base horizontally to roller 666; and thence downwardly at an inclined angle for a short distance to a roller 668, which is one of a series of similar rollers mounted (Fig. 13) on horizontal supports 670 and 672 secured to upper and back side walls 494 and 496. These rollers are particularly designed to cooperate with power driven rollers 602.

While a specific description of the manner in which the rollers just discussed are mounted is not given, it will be clear that a good deal of latitude is permissible in this regard. It is, of course, primarily important that the rollers be aligned at right angles to the moving tape base in substantially uniform contact therewith and that the rollers rotate easily. This helps to maintain equal tension on the tape base, thus inhibiting objectionable curling, and to keep the tape base moving in its normal path of travel.

Several expedients, in addition to those thus far discussed, advantageously are employed to assist the operator in getting a coating of uniform thickness on the tape base and to keep the coated tape base in accurate alignment on the rollers. In other words, these additional structural features are highly useful in obtaining a superior magnetic recording tape.

Taking up first the matter of securing a coating of uniform thickness, it will be noted on referring to Fig. 1 and reading from left to right that the last four in the series of power driven rollers 602 near the bottom of the chamber do not have cooperating rollers in the series of rollers 668 near the top of the chamber; and that due to a guide support or roller 676, relatively small in cross-section, located between the top and bottom levels of those four power driven rollers, the coated tape base is brought in contact with the tops as well as the bottoms of the driven rollers. So far as the tests to be described are concerned this particular arrangement is not necessary, but in the apparatus now in use it is convenient.

The four power driven rollers in question are designated **602*a*, 602*b*, 602*c* and 602*d*. Now referring to Figs. 14 and 15, which detail some of these structural features to better advantage, it will be noted that a cross-support 680 extends between and above rollers 602*a* and 602*b*, which is attached at its ends to the tops of vertical posts 682 and 684 secured at their bottoms to longitudinal supports 608 and 610; and that a similar cross-support 686 extends between and above rollers 602*c* and 602*d*, which is attached at its ends to the tops of vertical posts 688 and 690 secured at their bottoms to longitudinal supports 608 and 610**.

Returning to cross-support 680, a pair of spaced brackets 692 and 694 depend therefrom. They are spaced on the cross-support so as to overhang the edge portions of coated tape base 30. Magnetic charging heads 696 and 698 are mounted at the bottoms of the depending brackets in such a position as to contact and slightly to depress the tape base between rollers **602*a* and 602*b*. The magnetic charging heads are quite similar to the magnetic recording heads used on current magnetic tape recording machines, and are adapted to energize magnetically the running portion of the coated tape base within its field, as will be described in more detail below. In a similar manner, a pair of spaced brackets 700 and 702 depend from cross-support 686. Magnetic pick-up heads 704 and 706 are mounted at the bottoms of the depending brackets in such a position as to contact and slightly depress the tape base between rollers 602*b* and 602*c***. The magnetic pick-up heads are quite similar to the charging heads and to the magnetic pick-up or sound reproducing heads used on current combination magnetic recording and sound reproducing machines. They are adapted to pick-up magnetic energy from the running portions of coated tape base just energized by the charging heads, which energy may be measured and appraised as will be described below.

On tracing the course of the coated tape base in Fig. 1 from magnetic coating hopper 266 in zone D to rollers **602*a*, 602*b*, 602*c* and 602*d* in zone G, it will be noted that as the tape base leaves the hopper its top surface contains the coating; that this becomes the undersurface as the tape base advances through drying zones E and F; that in zone G the coating is kept out of contact with guide support 636 and rollers 656, 658, 660, 662, and 664; that the coating then contacts an object for the first time, namely, rollers 666 and 668 but not 676; and that the coating contacts the tops and bottoms of rollers 602*a*, 602*b*, 602*c*, and 602*d*. This arrangement permits a relatively long path of travel and hence a substantial amount of drying of the coating before it contacts rollers 666 and 668. Since rollers at that stage of the final drying operation have no harmful effect on the coating when in rolling contact therewith and since magnetic heads 696, 698, 704 and 706 (Figs. 13 and 14) would have a harmful effect on the coating when in rubbing contact therewith, the rollers and the magnetic heads are so arranged as to cause the coated surface of the tape base to be in rolling contact with rollers 602***a*, 602*b*, 602*c* and 602*d* and the reverse uncoated surface of the tape base to be in rubbing contact with the magnetic heads.

Figs. 19, 20 and 21 may now be referred to in further explanation of the foregoing. Tape base 30 is shown as moving from left to right (as also in Figs. 1, 14 and 15) with its magnetic coating 366 at the bottom and magnetic heads 696, 698, 704 and 706 at the top of the tape base in contact therewith. In other words, the magnetic heads are in contact with the uncoated surface of the tape base. As more particularly shown in Fig. 19, charging head 696 is provided with a gap 710 adjacent the coating and a wire coil 712, the ends of which terminate in main leads 714 and 716 connecting with a source of electricity 718. Branch leads 720 and 722 connect the main leads with a meter 724. In a similar manner charging head 698 is provided with a gap 730 adjacent the coating and a wire coil 732, the ends of which terminate in main leads 734 and 736 connecting with a source of electricity 738. Branch leads 740 and 742 connect the main leads with a meter 746.

Since magnetic charging heads 696 and 698 are in contact with the uncoated side of coated tape base 30, the magnetic field produced around gaps 710 and 730 must be somewhat larger than would be the case in conventional methods of sound recording when the magnetic recording heads are brought in contact with the magnetic coating. In other words, the magnetic field produced by the present charging heads must be sufficiently large to penetrate not only the tape base itself but also its undercoating of magnetic material. This is illustrated in Figs. 20 and 21. For purposes of illustration, magnetic head 696*a* in Fig. 20 may be considered as having a narrow gap 710*a*, substantially the same as that used in a conventional magnetic recording head. Magnetic field 750*a* does not completely penetrate the tape base. It does not, therefore, enter magnetic undercoating 366.

In the case of Fig. 21, on the contrary, gap 710 is substantially wider than gap 710*a*—thus assuring the generation of a magnetic field 750 sufficiently large and strong completely to penetrate both tape base 30 and its undercoating 366 of magnetic material. This is necessary, as it is in the case of charging head 698 and its gap 730, in order adequately to charge the running side portions of the coated tape base magnetically for the pick-up tests.

In operation current of desired wavelength is derived from sources 718 and 738 to energize charging heads 696 and 698 so that the coating on the portions of the tape base adjacent thereto may be charged with adequate signal strength. The charging heads are identical so far as possible so that each may discharge signals of the same strength. In other words, so far as possible the two charging heads are operated under the same conditions. If necessary they may be suitably calibrated to obtaining this result. Meters 724 and 746 are useful in determining whether the signal strengths are equal in strength. So far as the magnetic energization of the coating is concerned, therefore, the main remaining variable will be in the thickness of the coating as between the two sides of the coated tape base. Any difference in magnetic energization of the coating at the sides of the tape base should, therefore, be reflected in the pick-up tests that follow.

Returning to Fig. 19, pick-up head 704 is provided with a gap 756 adjacent the coating and a wire coil 758, the ends of which terminate in main leads 760 and 762 connecting with an amplifier 764. Leads 766 and 768 in turn connect the amplifier with a meter 770. In a similar manner pick-up head 706 is provided with a gap 776 adjacent the coating and a wire coil 778, the ends of which terminate in main leads 780 and 782 connecting with an amplifier 784. Leads 786 and 788 in turn connect the amplifier with a meter 790.

As in the case of the gaps of the charging heads, the gaps of the pick-up heads must be sufficiently wide to compensate for the thickness of the tape base as well as the coating. They must be able to encompass enough of the magnetically energized field in the coating on the underside of the tape base to pick up sound signals (field strength) truly representative of the strength of the magnetically energized side portions of the coating. As it is the signals picked up are amplified for convenient indication by the pointers of meters 770 and 790.

For comparison purposes the pick-up heads, like the charging heads, are identical so far as possible so that the main variables encountered are the thickness of the coating itself, and the quality of the coating, such as its magnetic material content, the dispersion of the magnetic material in the coating, etc. The pick-up heads may be calibrated to assure identical operating efficiency.

The pointers of meters 724 and 746 for charging heads 696 and 698 point to the same values, thus indicating that both side portions of coating 366 are being charged with identical amounts of magnetic energization. The pointers of meters 770 and 790 for pick-up heads 704 and 706 also point to the same values, thus indicating that both side portions of the coating are delivering identical amounts of magnetic energization. The latter fact further indicates that both side portions of the coating are identical in thickness; and that all is well with the magnetic coating operation in zone D (Fig. 1). If the coating there applied to the tape base has an optimum uniform thickness and is uniform in quality, present practice shows that that optimum uniform thickness and quality are maintained on the tape base as it passes under the charging and pick-up heads. Operating conditions are ideal, therefore, and such as the operators seek to establish and maintain.

While such ideal operations normally can be fairly well maintained after they are initiated, some adjustment is usually necessary when starting operations and sometimes during the midst of operations. In any event, the magnetic tests under consideration are highly useful in determining whether all is well so far as uniform thickness of coating and quality are concerned; and, if not, in indicating what adjustments are necessary in the coating operation to obtain or reobtain a coating of uniform thickness and quality.

Thus, if the reading on meter 770 varies from that on meter 790, the operator is at once advised that the thickness of the coating under pick-up head 704 is not the same as that under pick-up head 706. He, therefore, goes to zone D to make whatever adjustments are necessary in the coating to obtain a coating of uniform thickness. If, for example, the meter readings indicate that the coating is thinner under pick-up head 704 than under pick-up head 706, the operator will go to zone D (Fig. 1) and turn adjusting screw 358 (Figs. 10 and 12) on the same side of the tape base properly to depress that end of bottom guide support 324. To this end lock nut 362 is turned upwardly and the adjusting screw is then turned downwardly. The amount of turning in both instances is very small because the ultimate coating desired is itself quite thin. In any event the adjustment increases the depth of the gap between that side of feed hopper 266 and the bottom guide support, thus increasing the thickness of the coating at that side of the tape base.

The operator then returns to zone G (Fig. 1) to observe what effect his adjustment has on the pick-up meter readings. He must, of course, allow enough time for the adjusted coated portion of the tape base to reach the magnetic heads. This does not take long, depending of course on the speed of travel of the tape base; and he soon observes a change in the reading for meter 770. The new reading will indicate whether the adjustment was sufficient, insufficient or excessive. If not the former, he returns to zone D to make another adjustment. By trial and error the operator soon obtains a proper adjustment. If the discrepancy in thickness of coating is substantial, the affected part of the coated tape base is discarded.

From the foregoing, it will be clear that the operator relies on the meter readings to guide him in making whatever adjustments are necessary in the coating operation to assure a coating of uniform thickness. To regulate adjustment screws 358 and 360, he is guided almost entirely by the meter readings; and they can be made rather easily and quickly.

As already indicated, the coating may be of uniform thickness but not in quality. This occurs, for example, when the magnetic material coming from the feed hopper changes in quality, due perhaps to the introduction of a batch of magnetic material differing substantially in quality from that previously introduced. The meter readings promptly indicate such a change in quality and the operator can be guided accordingly.

Taking up next the matter of keeping the coated tape base in accurate alignment on the rollers, it will be noted on referring to zone G of Fig. 1, on reading from right to left, that after the coated tape base leaves the magnetic charging and pick-up heads just discussed, it passes up and down and progressively advances from a power driven roller 602 in the series below to a roller 668 in the series above until it reaches a round aligning guide 800 disposed between the first and second rollers 668 on reading from left to right, in the upper series. The aligning guide differs in construction from rollers 668 and is specially designed to help keep the coated tape base in alignment on rollers that precede and follow it.

Aligning guide 800 and its accompanying structure are detailed in Figs. 13, 16 and 17. Unlike rollers 668 in the upper series, the aligning guide is not suspended at its ends between pivot members (such as 110 and 112 in Fig. 7 and 584 and 586 in Fig. 13), for example, like roller 668 in Fig. 16. The aligning guide, however, is pivoted near one end by a vertical pin 802 to a bracket 804 attached to horizontal support 670 so that the guide may move about the pin angularly in a horizontal plane. The other end of the guide is slidably mounted in a channel 806 secured to horizontal support 672. A rod 808 extends horizontally through and is attached to that end of the guide. One end of a spring 810 is attached to one end of the rod and the other end of the spring is attached to an anchor 812 secured to horizontal support 672. The other end of the rod is attached to a bellows 814 carried by an underslung bracket 816 (Fig. 17) secured to the underside of the channel.

Now, turning to Fig. 13, it will be noted that a motor 820 is operatively connected to a suction or exhaust fan 822 from which extends a main suction conduit 824 which terminates in two branch conduits 826 and 828. The first branch conduit (Figs. 17 and 16) extends upwardly to and connects with bellows 814. The second branch conduit (Fig. 16) extends upwardly to and connects with a passageway or hollow tube 830 extending completely through and attached to aligning guide 800 intermediate its ends, but nearer the far end with the bellows. The open end of the passageway or hollow tube terminates in a small hole 832 in the right side of the aligning guide against which the tape base slides as it rises to and passes over the guide, in the direction of arrow 834. The hole is located where the far outside edge of the adjacent portion of coated tape base 30 should be passing when properly centered on the guide.

The function of the structure just described is to keep the edge of the far side of the tape base continually over the hole and hence to keep the moving tape base centrally aligned on the guide as well as on rollers that precede and follow the guide. This is possible because of the automatic manner in which the guide may be pivoted. Before going into the automatic phase of the operation, however, it may be helpful first to consider what happens when the guide is operated manually. If the guide is pivoted to the right as one views Fig. 13, it exerts greater pressure on the far side than on the near side of the tape base, thus causing the tape base to move laterally toward the near side; namely, away from hole 832. If the guide is pivoted to the left, reverse conditons obtain. Pressure of the guide on the tape base is lessened at the far side, and the tape base then creeps toward the far side; namely, over the hole 832.

The tension of spring 810 is such as normally to keep the guide pivoted slightly to the left so that the tape base tends to creep toward the far end of the guide; namely, over the hole. It may now be assumed that motor 820 is operating so that suction or exhaust fan 822, main conduit 824 and branch conduits 826 or 828 may be placed under suction when conditions call for suction. Whether branches 826 and 828 are under suction at a given moment depends on the condition of hole 832.

If, for example, the hole is only partially covered, say half-covered, the branch conduits will not be under effective suction because air is drawn into the hole and down its branch conduit 828. This air, therefore, prevents the development of effective suction in branch 828 as well as branch 826, thus leaving the guide pivoted slightly to the left of what may be called dead center; its normal position under the tension of the spring. If, next, the far side of the tape base moves over to cover the hole, branch conduits 826 and 828 are placed under suction. This suction reduces the air pressure in bellows 814, thus causing them to contract. When this occurs, the guide pivots to the right and the tape base creeps toward the near end of the guide support; namely, away from the hole. Since the hole is then only partially covered, air enters branch 828 and the suction in both branches 826 and 828 is broken. The spring then pulls the guide back to its former position slightly left of dead center. As this occurs, the tape base creeps toward the far end of the guide, thus again gradually covering the hole. Branches 826 and 828 are then placed under suction, causing the guide to pivot back to its former position slightly right of dead center.

In other words, aligning guide 800 swings back and forth like a pendulum, its arc of swing, however, being very small; and the tape base oscillates from side to side, its range of movement likewise being very small. Since the hole is quite small and it need be only partially uncovered to break the vacuum in the branch conduits, the pendulum movement of the guide and the side to side movement of the tape base are hardly perceptible by the eye. They have the effect, however, of keeping the tape base in its prescribed path of travel; which effect, moreover, tends to be transmitted to preceding and following rollers.

Going back to zone G of Fig. 1, it will be noted that the coated tape base leaves adjusting guide 800 for the first roller 668 in the upper series, reading from left to right; then passes down and under the first two power driven rollers 602 in the lower series, again reading from left to right; and next moves up and over power driven discharge roller 580 at discharge opening 542 in near-end wall 490. It will be recalled (Fig. 13) that the discharge roller is mounted on spindle 582 carried by side supports 588 and 590 attached to front and back side walls 494 and 496 of the final drying chamber.

A hold-down roller 840 (Fig. 1) of adequate weight extends transversely across the top of the discharge roller. It rests by gravity, and therefore exerts a holding force on the coated tape base passing over the discharge roller. The ends 842 and 844 (Fig. 13) of the hold-down roller are smaller in diameter than the main portion and fit in drop-slots 846 (Fig. 1) in side supports 588 and 590 (Fig. 13), the slots acting merely as retainers for the hold-down roller ends and being sufficiently deep so that the hold-down roller is supported freely on the discharge roller and the two together are adapted to grip the coated tape base. This becomes important, for example, when it is desired to separate the portion of coated tape base already discharged from the drying chamber from the oncoming portion. The tape base outside of discharge opening 542 may be cut without fear that the end next to the opening will be drawn back into, and cause a piling up of oncoming coated tape base in, the final drying chamber. The arrangement described permits cutting of the tape base discharged from the drying chamber and at the same time keeping the oncoming tape base within the drying chamber under its normal tension.

*Tape base discharging zone H*

Again returning to Fig. 1, coated tape base 30 passes from discharge roller 580 and hold-down roller 840 through opening 542 in the end wall of the final drying chamber to discharge zone H to be wound into a roll. The apparatus for this purpose includes a platform 900 and a brace 902 attached below the opening to the end wall of the chamber; a motor 904 operatively connected to a gear reducer 906 with a shaft and a sprocket wheel, not shown; an endless drive chain 912 (Fig. 13) mounted on the sprocket and a second sprocket wheel 914 mounted on a shaft 916 supported in journals 918 and 920; the right end of the shaft, as one views Fig. 13, being free and integrally fitted with a core 921 adapted to fit in and be keyed to a hub 922 around which the coated tape base is wound into a roll 923. The core is provided with an integral stop 924 and an integral key 925, spaced oppositely from one another. The hub is in turn provided with a key-way 926 adapted to receive the core key.

The apparatus also includes a footage counter 930 secured to the lower end of a bracket 932 pivotally mounted at its upper end 934 to the upper end of an upright post 936 secured at its bottom to the platform. A journal 938 is secured to the bracket, through which extends a shaft 940 operatively connected at its left end to the counter and at its right end to a friction disc 942, covered for example, with rubber, resting on and adapted to be turned by the roll of coated tape. Due to the manner in which the bracket is pivoted, the disc, and hence the shaft and counter, rises as the roll of coated tape base increases in size.

If desired, uncoated roll 32 of tape base may be converted entirely into coated roll 923; that is, the overall length of the coated roll will be substantially the same as that of the uncoated roll. In practice it is usually desirable to start operations with a relatively large uncoated roll and to obtain therefrom a number of smaller coated rolls of specified footage. Footage counter 930 is useful for the purpose. When the coated roll reaches the desired amount of footage, the coated tape base is cut transversely as it leaves discharge opening 542 in the final drying chamber.

A few preliminary steps are advantageously taken: Motor 904 is stopped, hub 922 is loosened from core 921 and its key 925; roll 923 and its hub are pulled toward the near end, away from the core; another hub is keyed to the core; the coated tape base is cut as it continues to issue from the discharge opening; the free end of the tape is secured to the hub; motor 904 is started and speeded to take up the slack portion of coated tape base outside of the discharge opening; and the speed of the motor is then adjusted to wind the coated tape base at its normal rate on the new roll.

If, as indicated above, an obstruction on the tape base impairs the thickness of the coating of magnetic material deposited thereon as the tape base passes under feed hopper 266 and over bottom support 324, the operator, in response to a signal initiated thereby, locates the obstruction and places a marker, such as a tab, over the peripheral portion of the coated tape base for easy detection. Also, if the magnetizing tests described above show sections of the tape base to be improperly coated, they are similarly marked by the operator. The coated roll of tape base after drying is unwound to lay bare the section or sections affected. They are cut out and the ends of the main portion of the tape base are suitably spliced, preferably in end to end, butt-end, relationship so that the thickness of the coating at the splice joint is of the same uniform thickness as the remainder of the tape base.

In a present practice of the invention, the tape base is six inches wide. Each roll of coated tape base, after drying and after the affected sections are removed and the free ends are spliced, is cut as it is unwound into a plurality of pieces of tape of desired width and each piece of tape so cut is wound simultaneously into a separate roll of desired footage.

It will be clear to those skilled in this art that the above described example of a practice of the invention is only by way of illustration and other useful modifications may be employed.

Various features of the method and apparatus herein disclosed are claimed in our co-pending applications Serial Nos. 201,974 and 201,976 to 201,983, inclusive, filed simultaneously with the present application.

We claim:

1. In apparatus for producing magnetic sound-recording and sound-reproducing tape, the improvement which comprises a coating machine having a feed-hopper with a horizontally disposed discharge opening, a horizontally disposed tape base support thereunder, tensioning means for keeping the tape base taut longitudinally as it passes over the bottom support under the feed-hopper, guide means forwardly of and rearwardly of the discharge opening of the feed-hopper positioned immediately adjacent to the normal path of travel of a relatively long and narrow tape base to keep the under side of the advancing tape base in taut surface-to-surface sliding contact with the bottom support, adjustable means for fixing and maintaining the feed-hopper and the tape base support normally at a predetermined minimum distance from one another to provide a gap for the passage therethrough of the tape base and for depositing a layer of a liquid dispersion of free-flowing magnetic material of uniform minimum thickness onto the top surface of the tape base as it moves under tension over the support, yielding means permitting momentary increase of the height of the gap between the support and the hopper in response to and directly by an obstruction on the tape base just far and long enough to permit the obstruction to pass between the hopper and support without serious damage to the tape base and for decreasing the height of the gap to its former predetermined height as soon as the obstruction passes therethrough, a drying machine associated with the discharge end of the magnetic coating machine for drying the freshly coated tape base, and power driven means for advancing the tape base through the coating and drying machines.

2. Apparatus according to claim 1, in which the yielding means are in the form of springs that support the tape base support under the feed hopper.

3. Apparatus according to claim 1, in which a spindle for holding and feeding a roll of the tape base to be coated is positioned in advance of the feed-hopper, adjusting means are associated with the spindle for setting and maintaining its transverse position with respect to the normal path of travel of the tape base to the feed-hopper, and the spindle is provided with brake means for controlling the speed at which the tape base is fed from the roll.

4. Apparatus according to claim 1, in which a roller for guiding and supporting the tape base to be coated is located in advance of the feed-hopper, and swivel means are associated with the roller to equalize the tension transversely of the tape base and thus to help take out curl already present in and to inhibit further curling of the tape base as it moves to the feed-hopper for coating.

5. Apparatus according to claim 1, in which a pair of juxtaposed rollers for guiding and gripping the tape base between them is located in advance of the feed-hopper; and adjusting means are associated with one of the rollers for setting and maintaining it at a desired pressure against the other roller as the tape base moves between the two rollers on its way to be coated.

6. Apparatus according to claim 1, in which a pair of juxtaposed rollers for guiding and gripping the tape base between them is located in advance of the feed-hopper; one of the rollers has a fixed axis and a flywheel mounted to one end adapted to help keep the tape base under tension; the other roller has a movable axis and adjusting means associated therewith for setting and maintaining the roller at a desired pressure against the other roller as the tape base moves between the two rollers on its way to be coated.

7. Apparatus according to claim 1, in which the drying machine includes an air heater connected to an elongated duct so that the freshly coated tape base from the coating machine may have an extended path of travel in the duct while in contact with heated air.

8. Apparatus according to claim 1, in which the drying machine includes a drying chamber; an air heater connected to the chamber; and a radiant-heat source associated with the chamber so that the freshly coated tape base from the coating machine may be subjected to drying while in contact with heated air and radiant heat.

9. Apparatus according to claim 1, in which the drying machine includes a drying chamber; a plurality of spaced power driven rollers and idler rollers in the chamber for moving the coated tape base in a predetermined path of travel; an air heater connected to the chamber; and a radiant-heat source associated with the chamber so that the freshly coated tape base may be subjected to drying while in contact with heated air and radiant heat.

10. Apparatus according to claim 1, in which an adhesive pre-coating machine is positioned in advance of the magnetic coating machine; the pre-coating machine has a horizontally disposed discharge opening extending over the path of travel of the tape base to deposit a layer of free-flowing adhesive material thereon as the tape base moves toward the magnetic coating machine.

11. Apparatus according to claim 1, in which an adhesive pre-coating machine and a pre-coat drying machine are positioned in advance of the magnetic coating machine; the pre-coating machine has a horizontally disposed discharge opening extending over the path of travel of the tape base to deposit a layer of free-flowing adhesive material thereon as the tape base moves to and through the pre-coat drying machine to the magnetic coating machine.

12. Apparatus according to claim 1, in which an adhesive pre-coating machine is positioned in advance of the magnetic coating machine; the pre-coating machine has a feed-hopper with a horizontally disposed discharge opening extending between and slightly below the top level of a pair of spaced guide supports in the path of travel of the tape base so that the tape base is depressed in the space between the two supports in wiping engagement with the bottom of the adhesive feed-hopper to deposit a very thin layer of free-flowing adhesive material thereon as the tape base moves toward the magnetic coating machine.

References Cited in the file of this patent

UNITED STATES PATENTS

| | | |
|---|---|---|
| 1,871,790 | Hansen | Aug. 16, 1932 |
| 1,961,025 | Wickham | May 29, 1934 |
| 2,330,300 | MacDonald | Sept. 28, 1943 |
| 2,459,396 | Solona et al. | Jan. 18, 1949 |
| 2,508,484 | Barkstrom et al. | May 23, 1950 |
| 2,513,434 | Tinsley | July 4, 1950 |
| 2,542,064 | Tilden | Feb. 20, 1951 |